Figure 1:
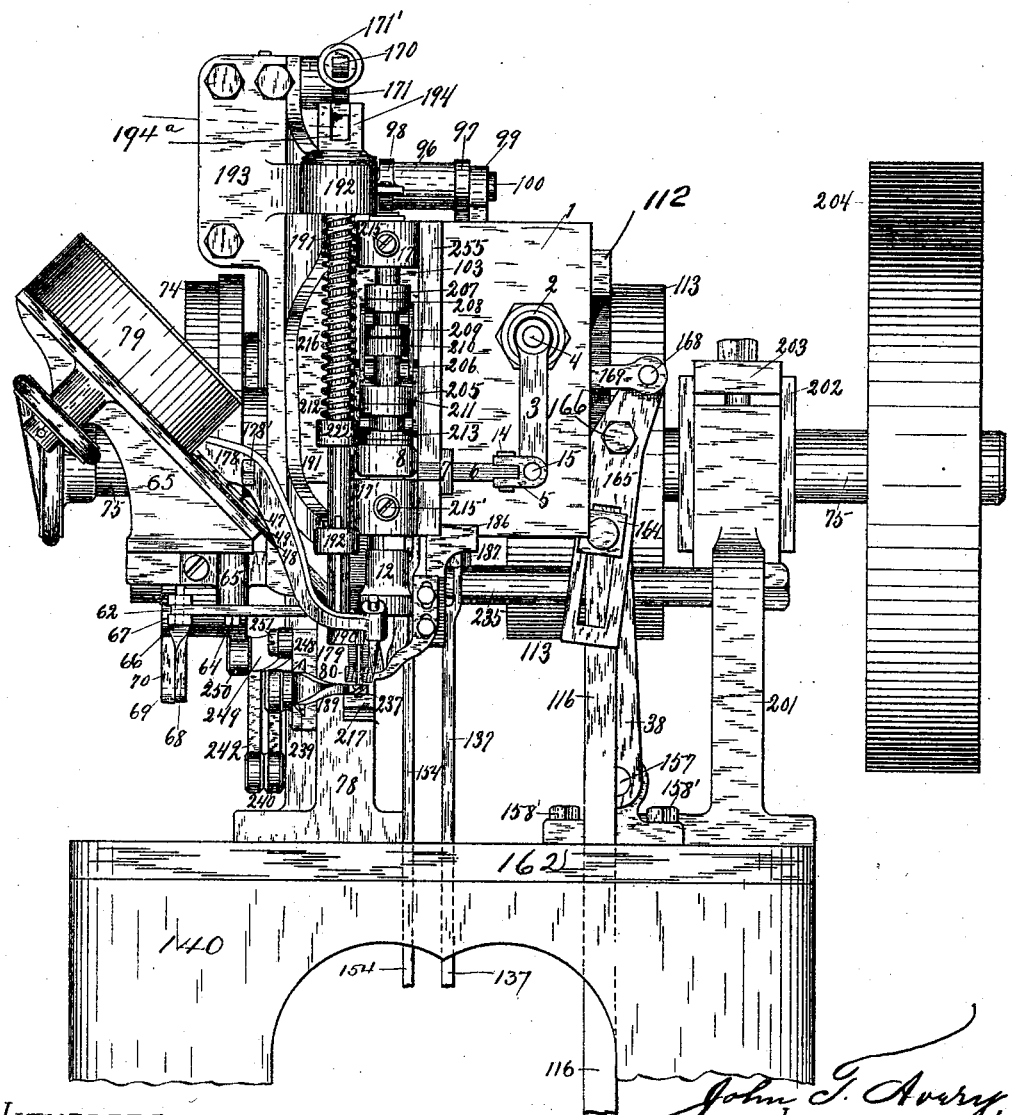

(No Model.) 17 Sheets—Sheet 1.
J. T. AVERY.
LASTING MACHINE.

No. 500,548. Patented July 4, 1893.

WITNESSES.
O. Ramel
H. K. Wagner

John T. Avery,
INVENTOR.
By his Attorney,
Paul Bakewell (No Model.)  17 Sheets—Sheet 4.

J. T. AVERY.
LASTING MACHINE.

No. 500,548.  Patented July 4, 1893.

WITNESSES.
INVENTOR.

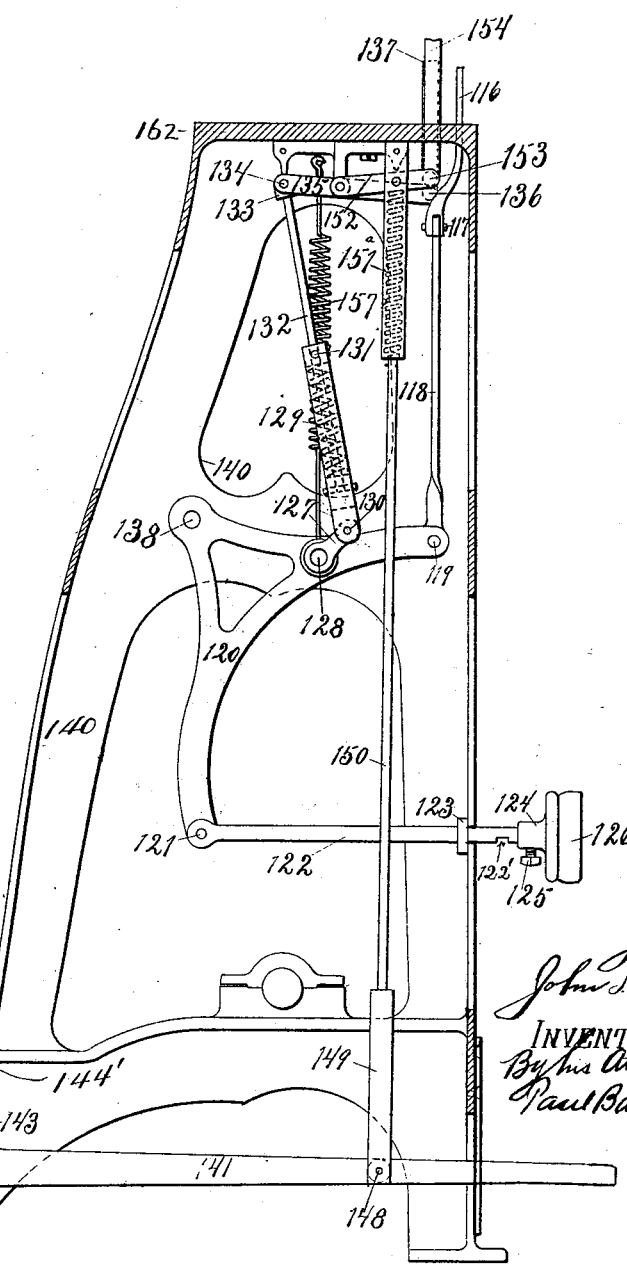

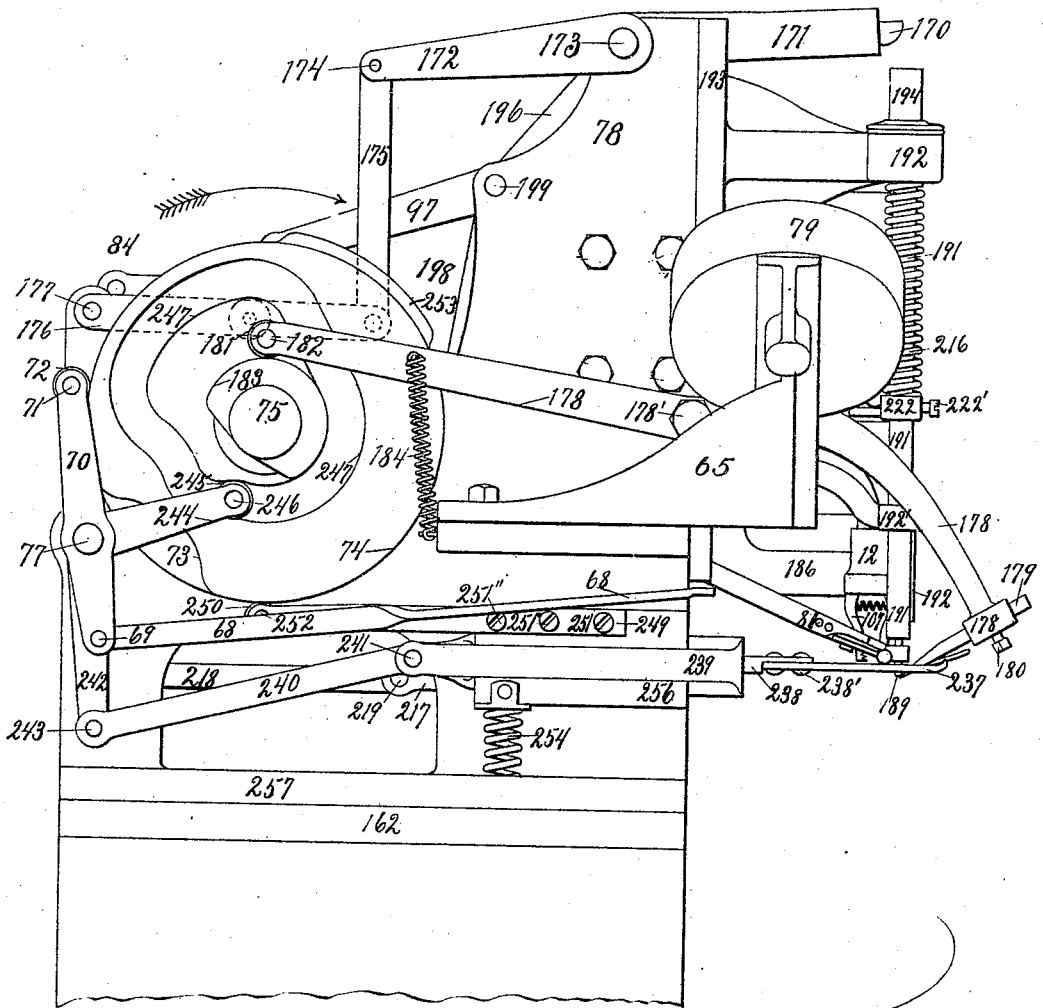

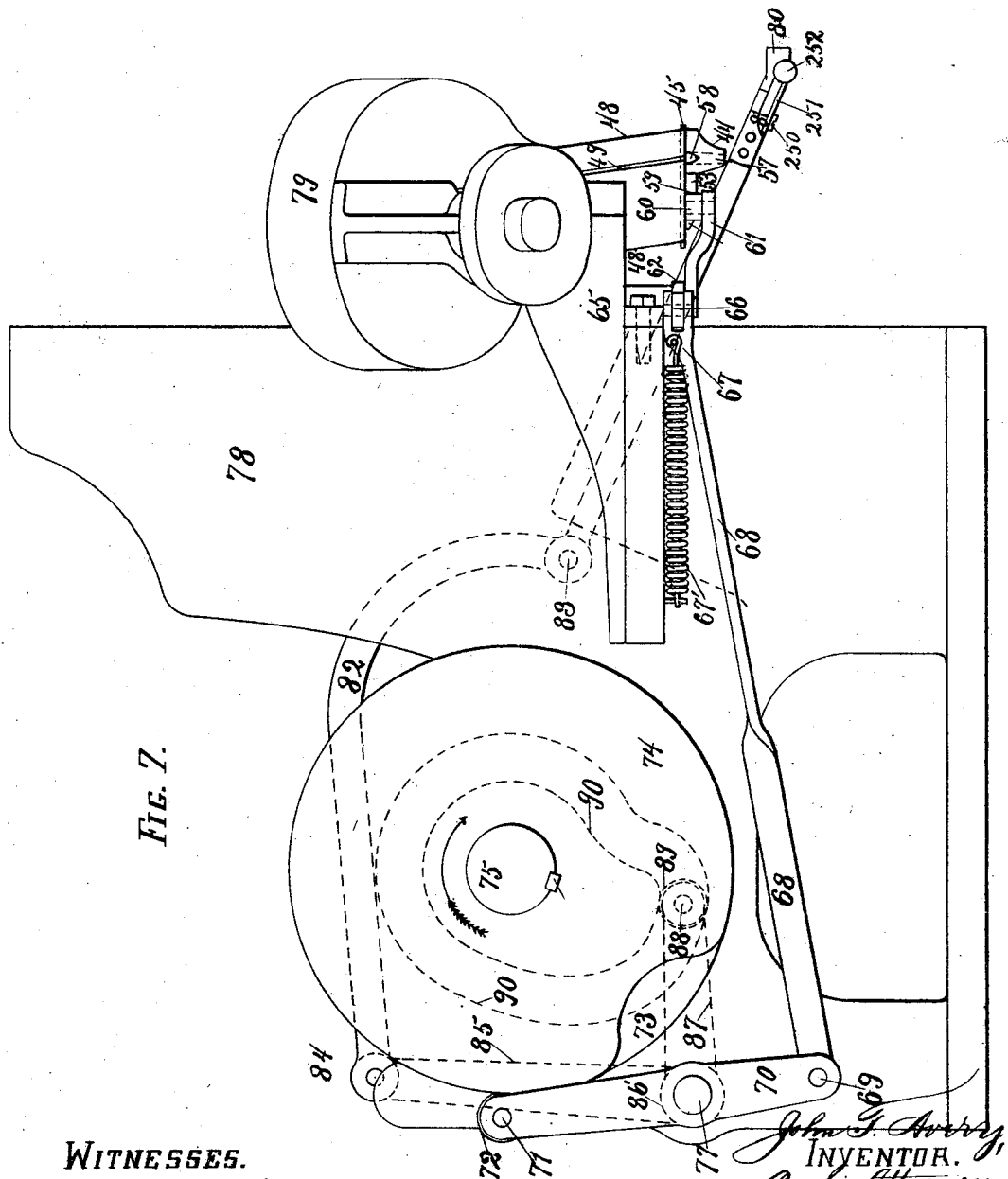

(No Model.)
J. T. AVERY.
LASTING MACHINE.
No. 500,548.
17 Sheets—Sheet 8.
Patented July 4, 1893.
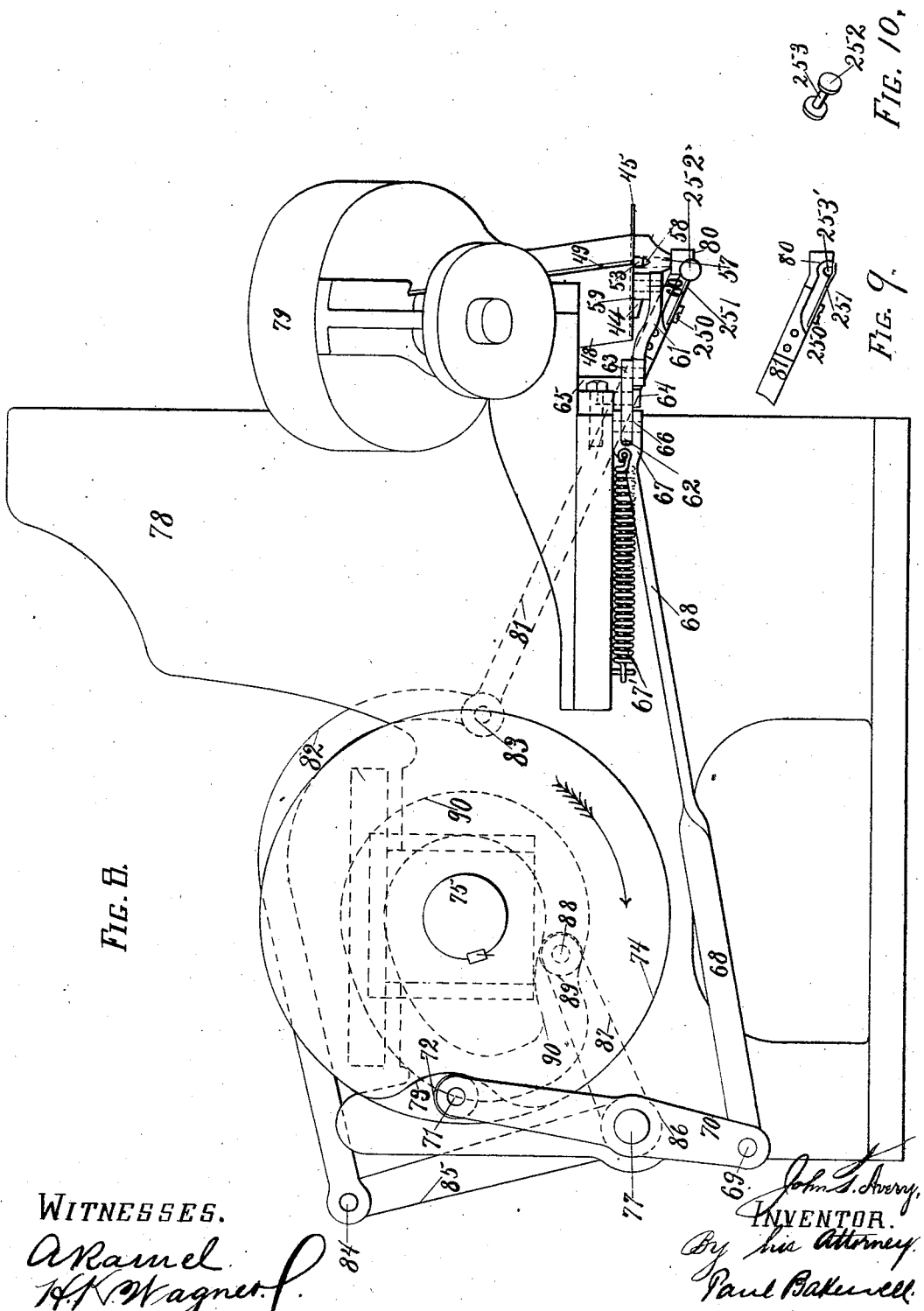
WITNESSES.
A Ramel
H. K. Wagner
INVENTOR.
John T. Avery,
By his Attorney
Paul Bakewell.

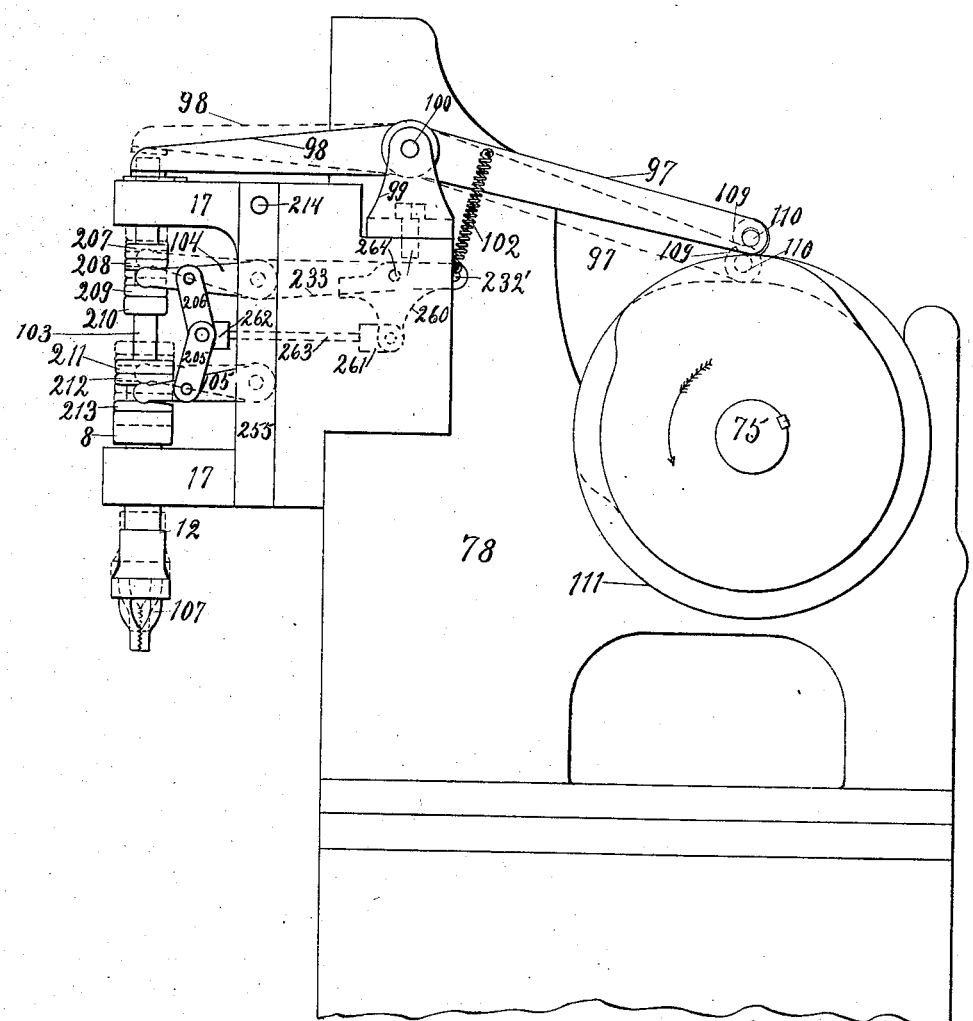

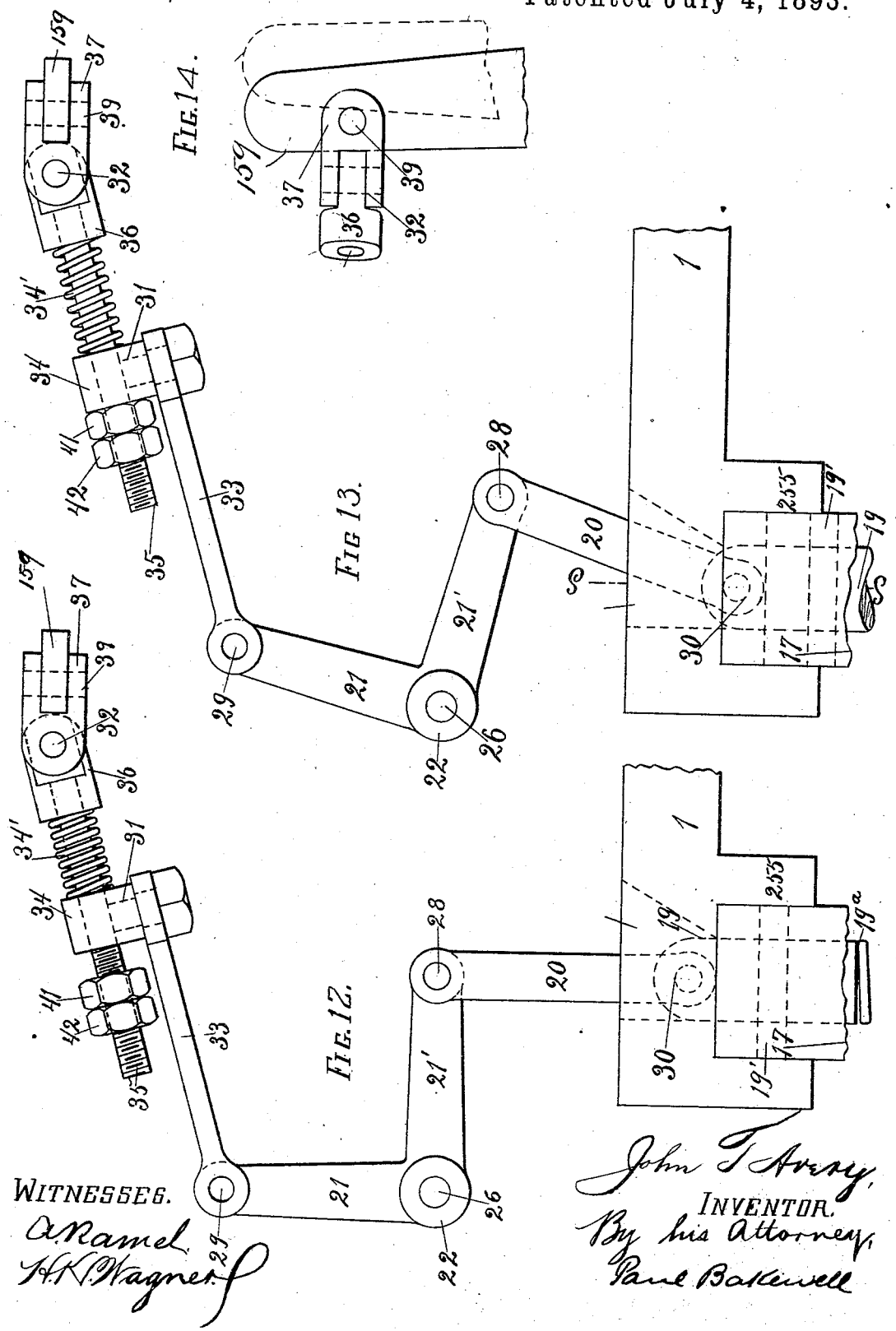

(No Model.) 17 Sheets—Sheet 11.
J. T. AVERY.
LASTING MACHINE.
No. 500,548. Patented July 4, 1893.
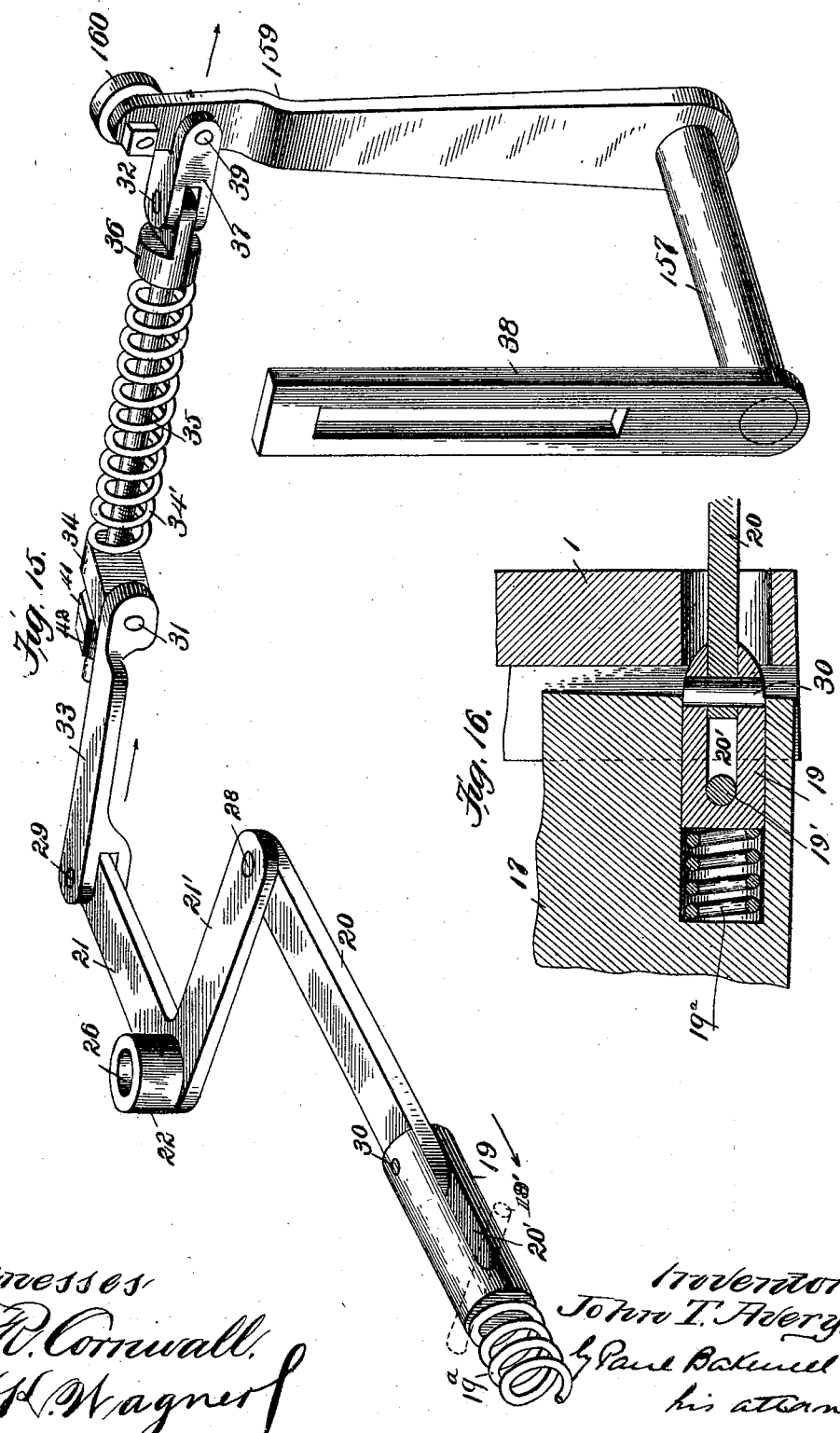
Witnesses
F. R. Cornwall
H. H. Wagner
Inventor
John T. Avery
by Paul Bakewell
his attorney (No Model.)  17 Sheets—Sheet 12.
J. T. AVERY.
LASTING MACHINE.
No. 500,548. Patented July 4, 1893.
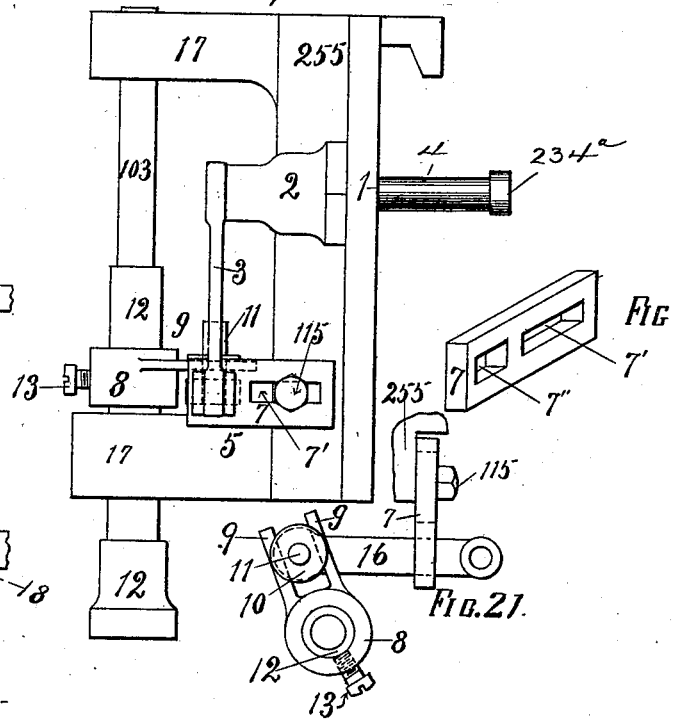
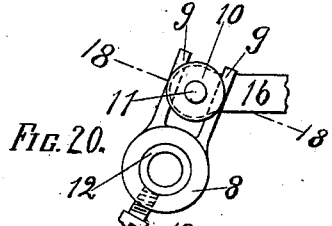
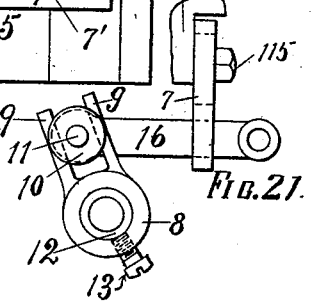
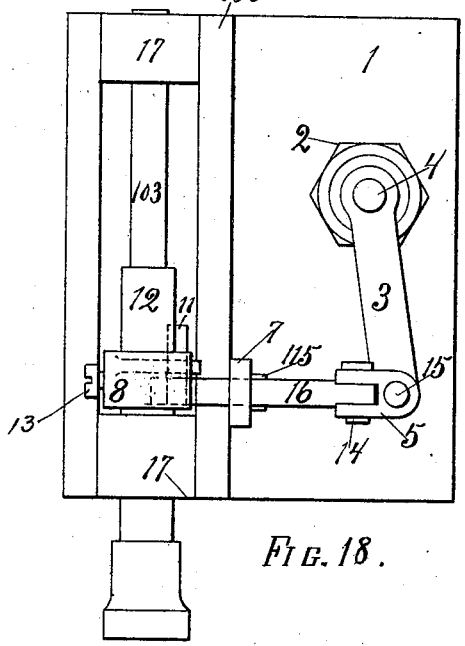
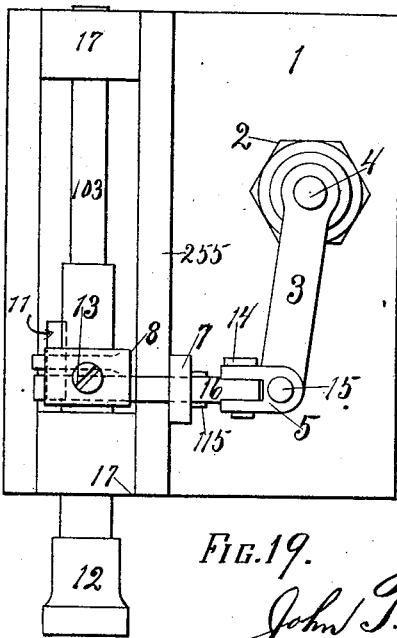
WITNESSES.
A. Ramel
H. K. Wagner
John T. Avery,
INVENTOR.
By his Attorney
Paul Bakewell (No Model.)

17 Sheets—Sheet 13.

J. T. AVERY.
LASTING MACHINE.

No. 500,548.

Patented July 4, 1893.

Witnesses
F. R. Cornwall
H. H. Wagner

Inventor
John T. Avery
By Paul Bakewell
his attorney (No Model.)

17 Sheets—Sheet 14.

J. T. AVERY.
LASTING MACHINE.

No. 500,548.  Patented July 4, 1893.

Witnesses
F. H. Cornwall
H. H. Wagner

Inventor,
John T. Avery
By Paul Bakewell
Atty.

(No Model.)

J. T. AVERY.
LASTING MACHINE.

No. 500,548.

17 Sheets—Sheet 15.

Patented July 4, 1893.

WITNESSES.
A. Ramel
H. K. Wagner

John T. Avery,
INVENTOR.
By his Attorney
Paul Bakewell (No Model.)

J. T. AVERY.
LASTING MACHINE.

No. 500,548.

17 Sheets—Sheet 16.

Patented July 4, 1893.

Witnesses
F. R. Cornwall.
A. Ramel.

Inventor
John T. Avery.
By Paul Bakewell
atty (No Model.)
J. T. AVERY.
LASTING MACHINE.
No. 500,548.  Patented July 4, 1893.
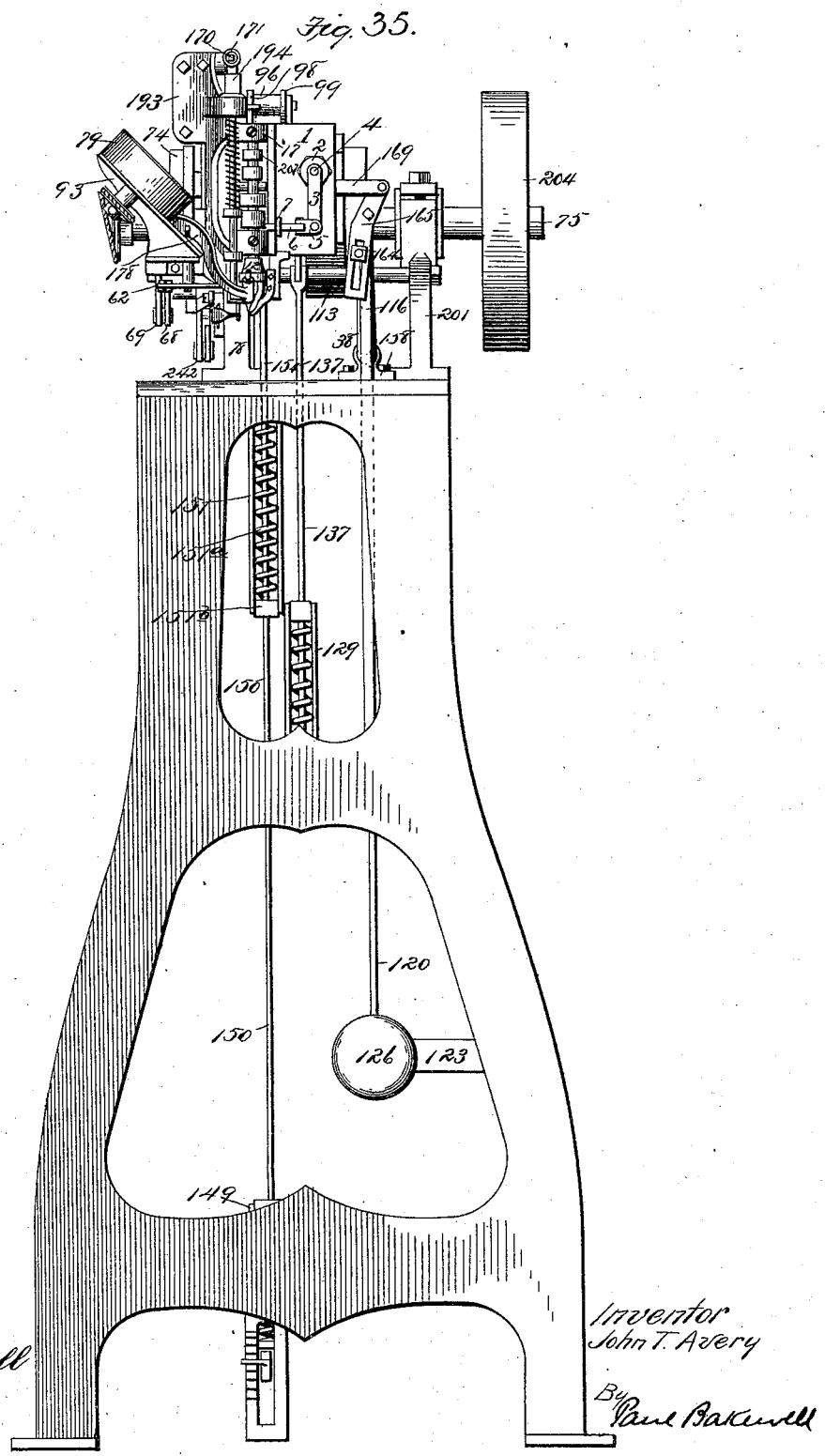

UNITED STATES PATENT OFFICE.

JOHN T. AVERY, OF ST. LOUIS, MISSOURI, ASSIGNOR TO THE AVERY LASTING MACHINE COMPANY, OF SAME PLACE.

LASTING-MACHINE.

SPECIFICATION forming part of Letters Patent No. 500,548, dated July 4, 1893.

Application filed March 19, 1892. Serial No. 425,630. (No model.)

*To all whom it may concern:*

Be it known that I, JOHN T. AVERY, a citizen of the United States, residing in the city of St. Louis, State of Missouri, have invented certain new and useful Improvements in Lasting-Machines, of which the following is a full, clear, and exact description, such as will enable others skilled in the art to which it appertains to make and use the same.

My invention relates to certain new and useful improvements in lasting machines, such improvements being especially designed for application upon a machine invented by me, and patented April 12, 1892, bearing No. 472,599.

The first feature of this present invention resides in the peculiar construction of the tack deliverer and separator, and in the means for operating the same; second, in the arrangement of the cams and their correlative parts, connected with the laterally-movable head-stock and the gripper-jaws, whereby, when the former is thrown into an operative position, the gripper-jaws are affected to co-act, simultaneously therewith, and have imparted thereto a rotary motion; third, in the construction and arrangement of means, hereinafter to be described, to rotate the gripper-jaws; fourth, in the construction and arrangement of a train of levers connected with the laterally-movable head-stock, and the means for actuating said train, to effect a forward and backward movement of the gripper-carrier; fifth, in the peculiar construction of the tack holder, and the means for thrusting the same into operative position, and, also, the means for withdrawing the same out of the way of the "feed" of the stock; sixth, in the construction of the folder-arm and its means of operation; seventh, in the means for holding the gripper-shaft against vertical movement while the jaws are in the act of gripping; also, preventing a too sudden jerk when the jaws are raised to stretch the upper; eighth, in the arrangement and operation of a series of foot levers, in the frame of the machine, for controlling the movement of the several parts, and, finally, in the construction, arrangement, and combination of several minor features, all as will hereinafter be described, and afterward pointed out in the claims.

Figure 2:
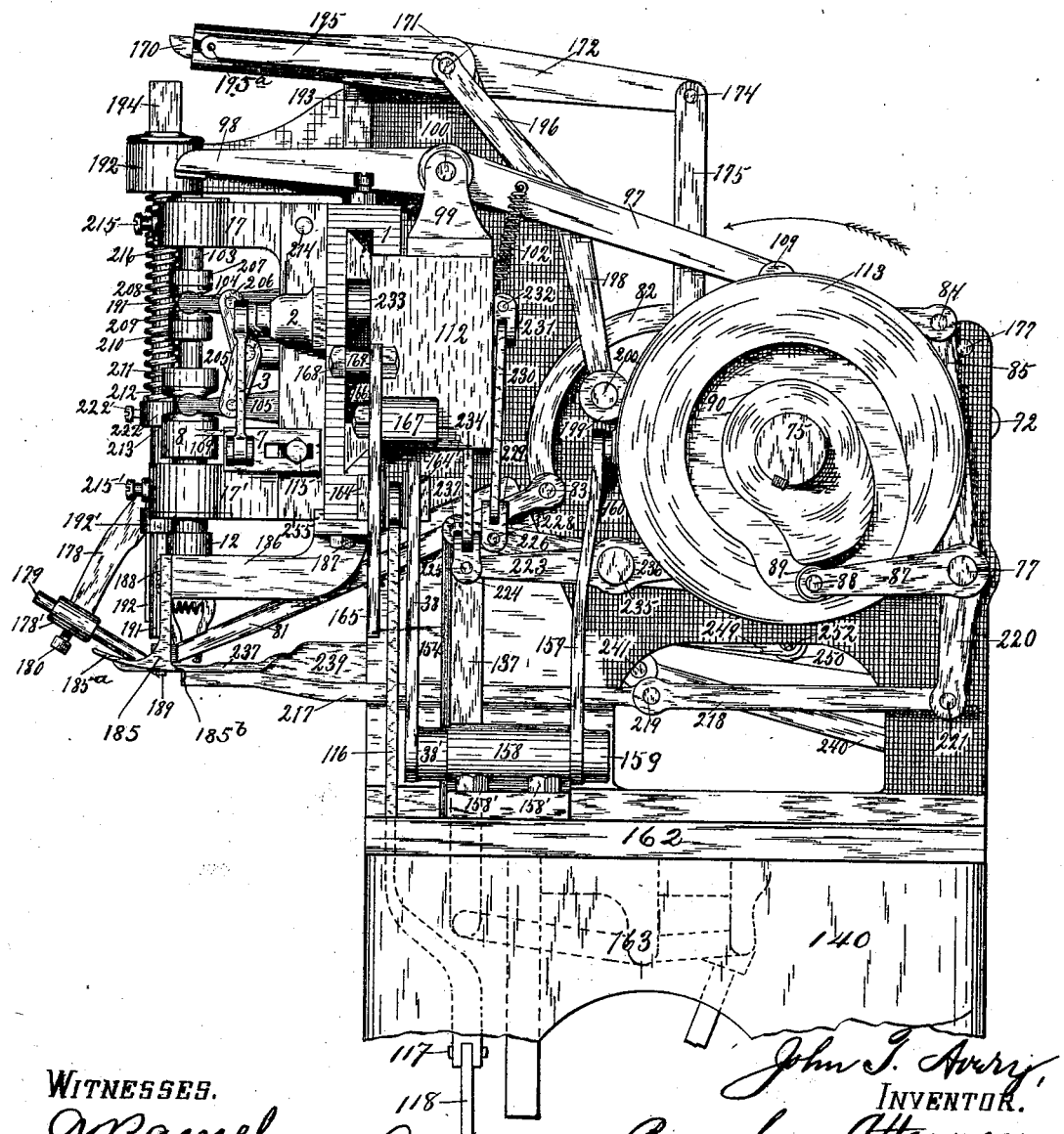
Figure 3:
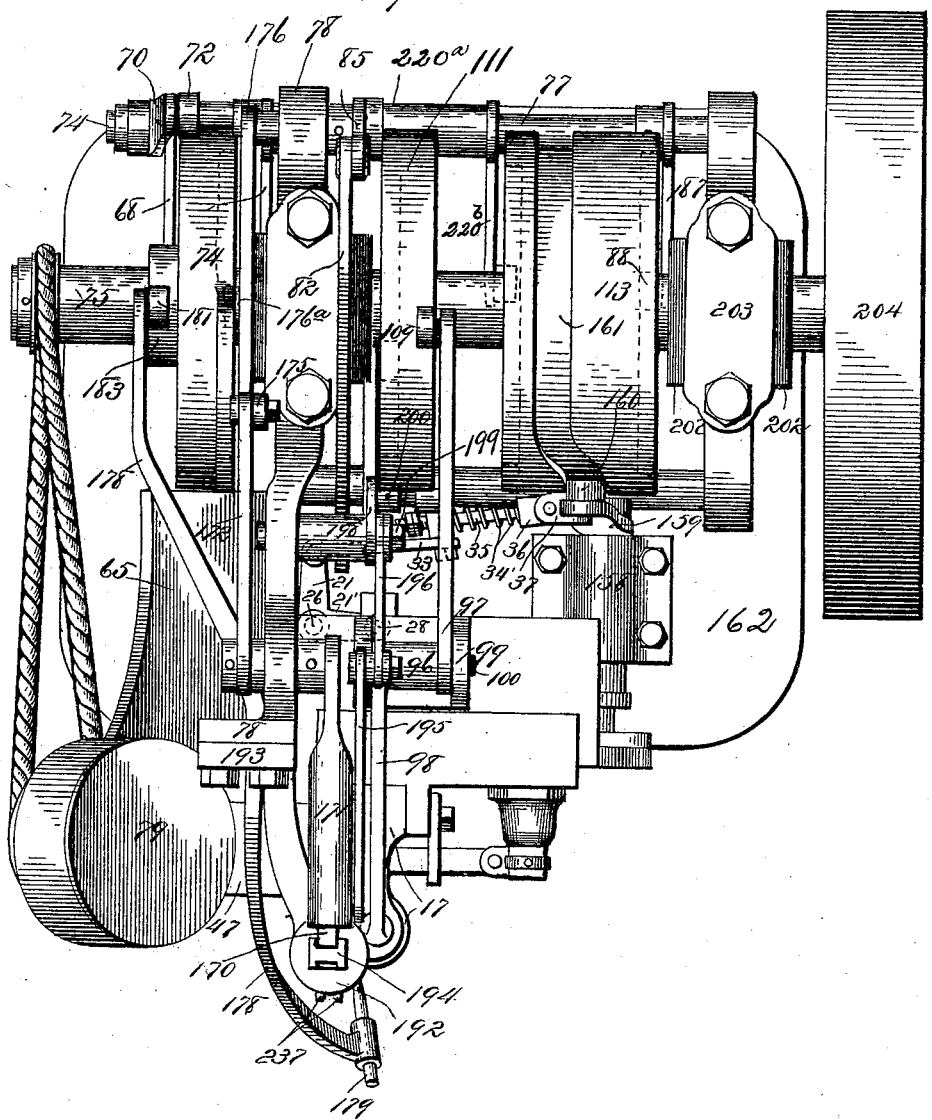
Figure 4:
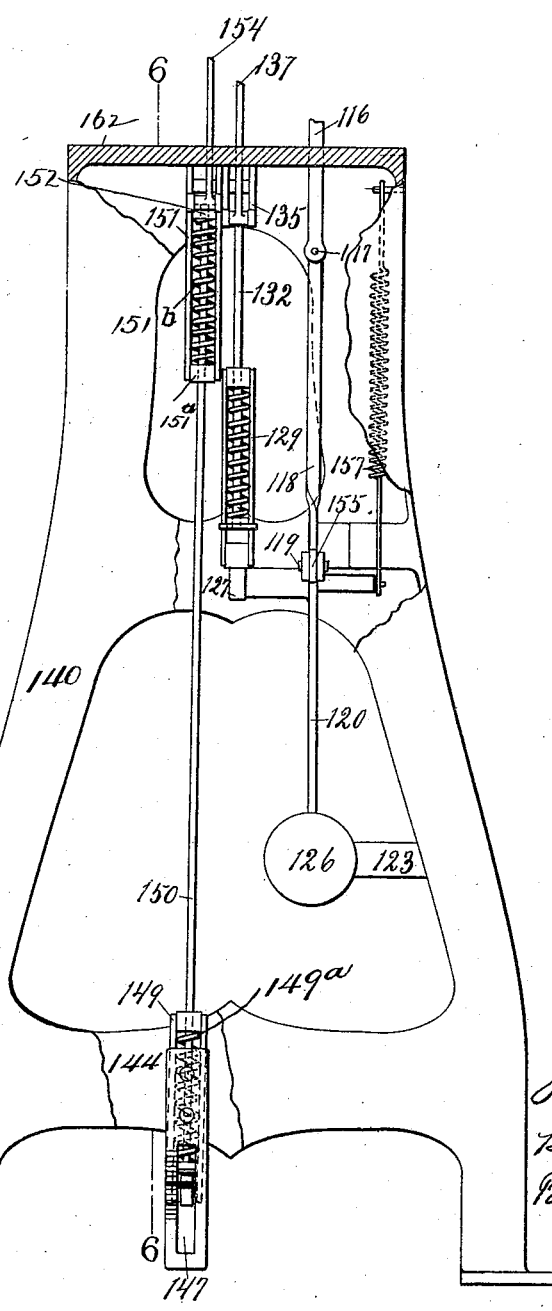
Figure 24:
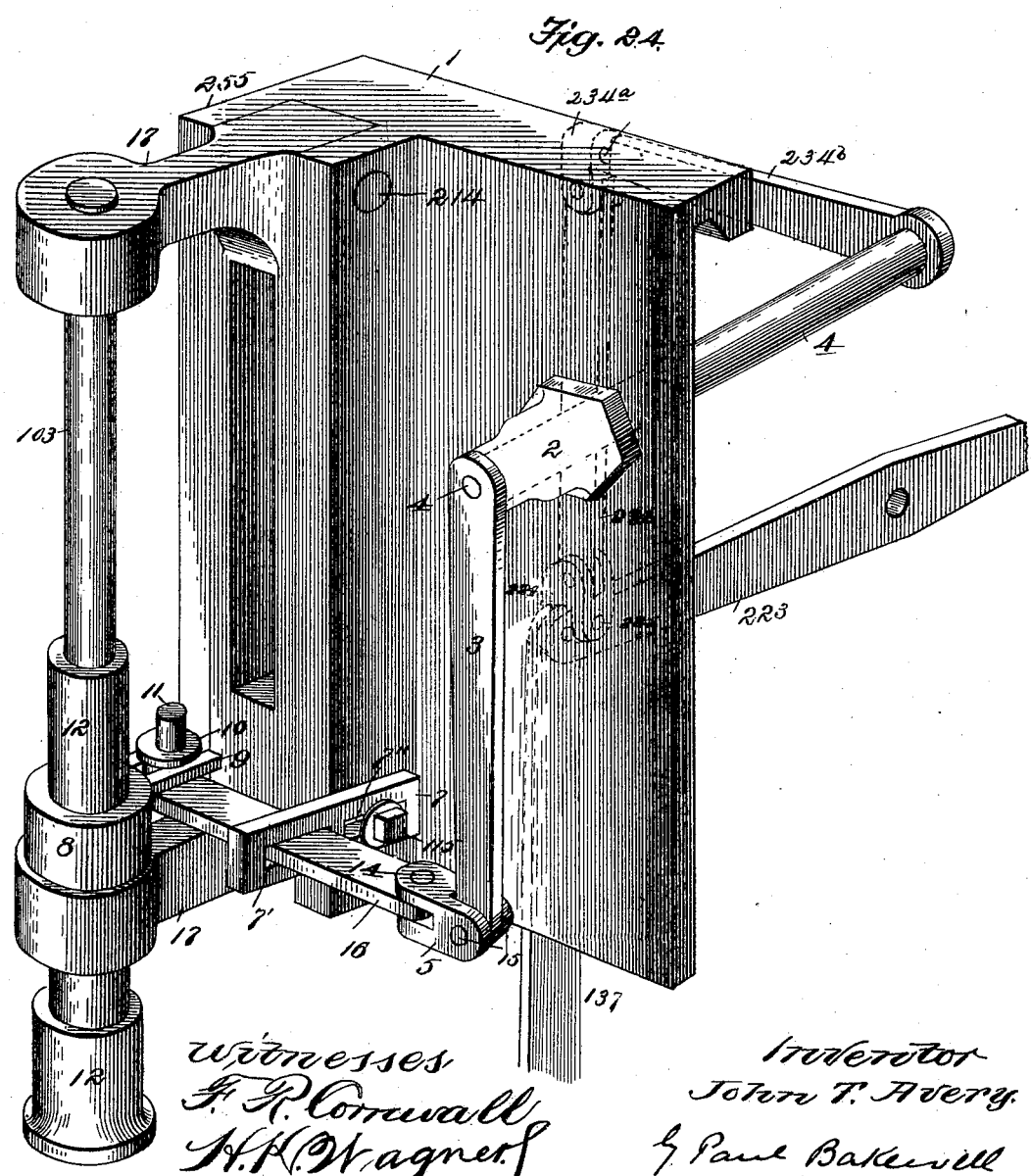
Figure 25:
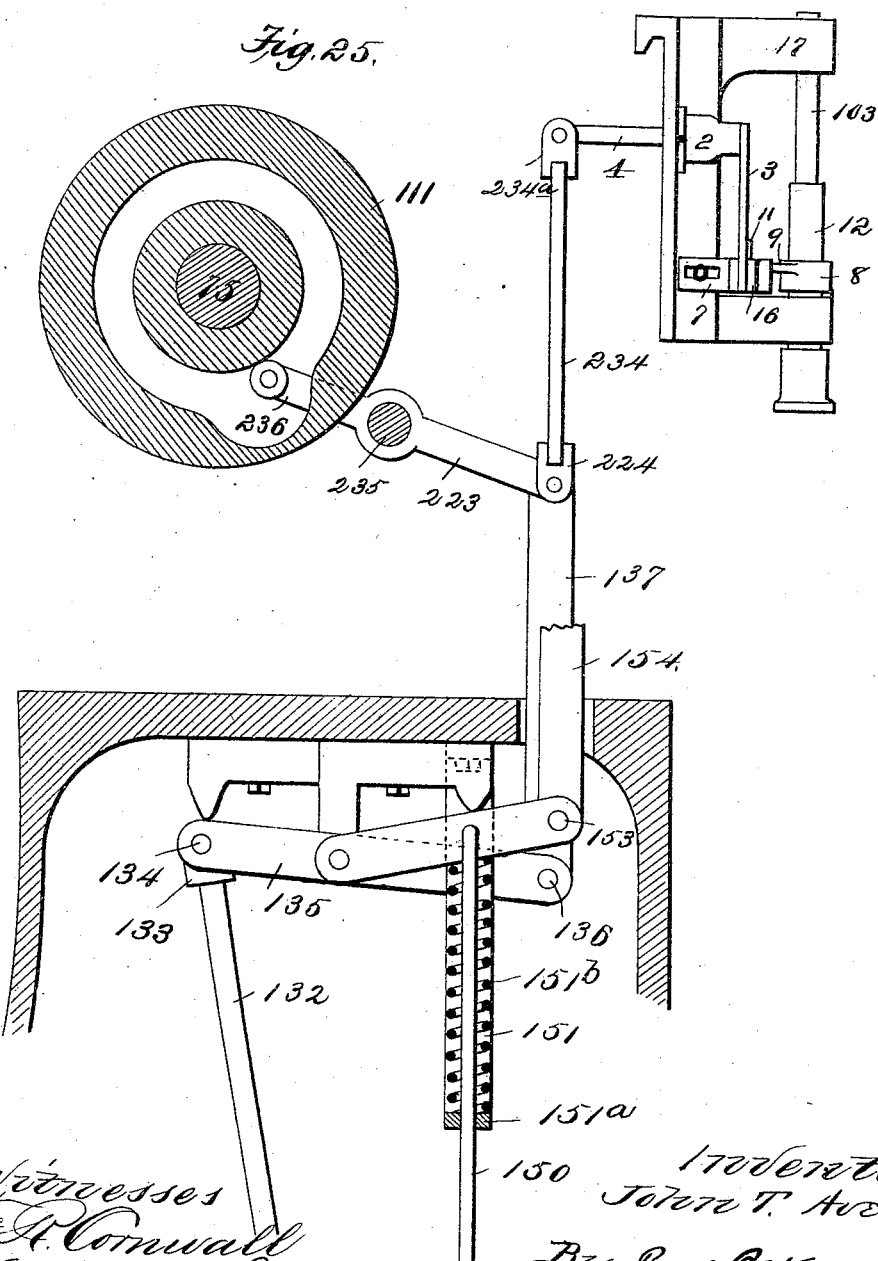
Figure 28:
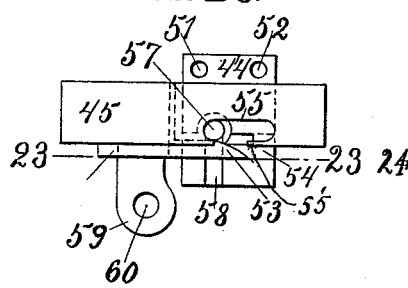
Figure 27:
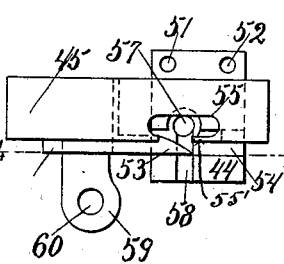
Figure 26:
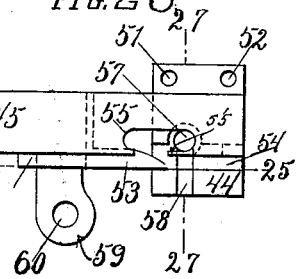
Figure 31:
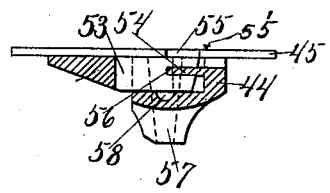
Figure 30:
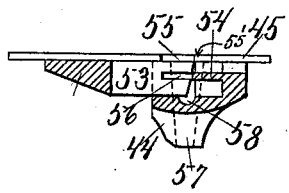
Figure 29:
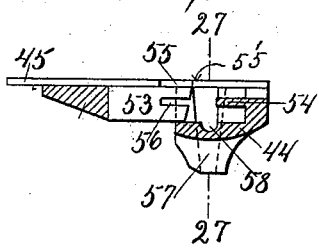
Figure 33:
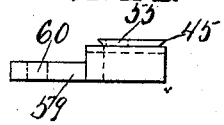
Figure 32:
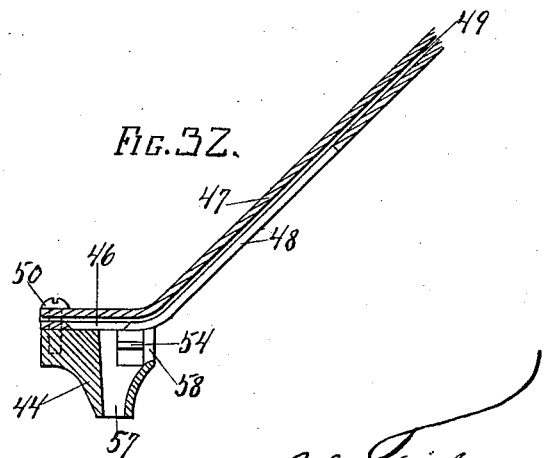
Figure 34:
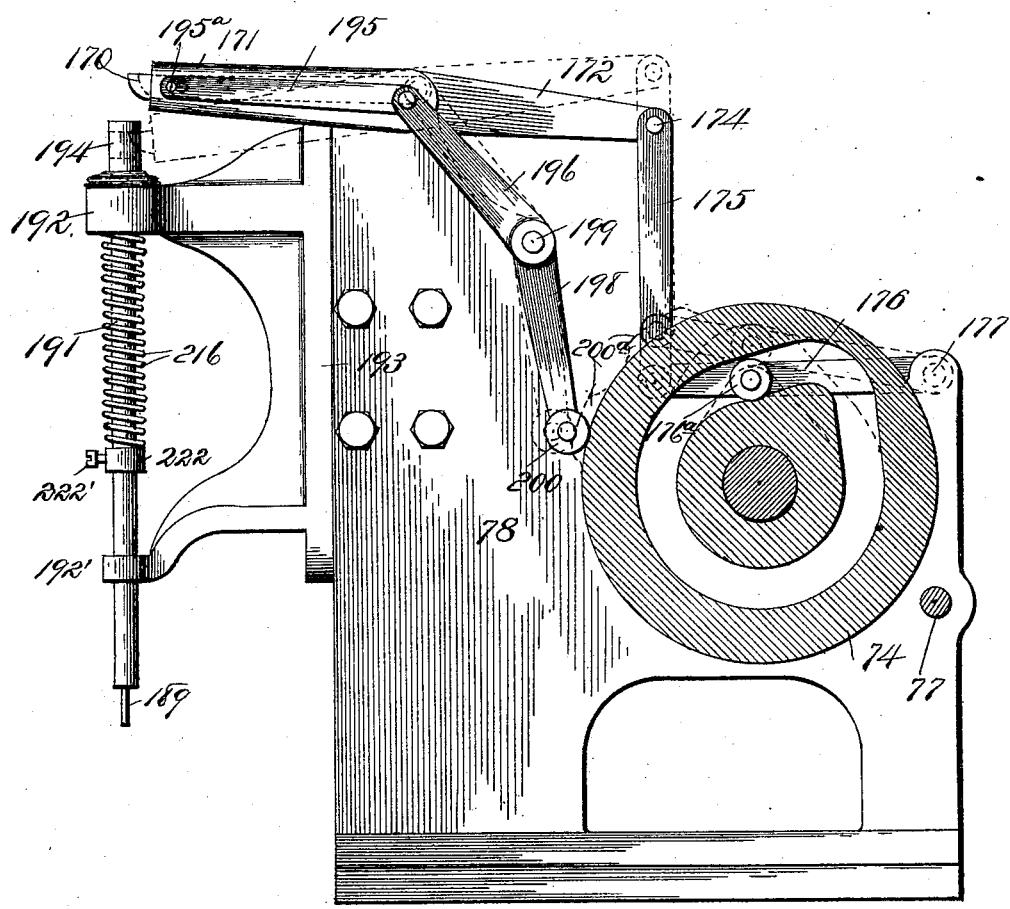

In the drawings forming a part of this specification, wherein like symbols refer to like parts wherever they occur, Figure 1 is a front elevation. Fig. 2 is a side elevation. Fig. 3 is top plan view. Fig. 4 is a front elevation of the base, or frame, upon which the machine is placed, showing the arrangement of the different controlling levers therein. Fig. 5 is a sectional elevation thereof on line 6—6. Fig. 6 is a diagrammatical view, in side elevation, of the guide arm, tack-holder, feed-arm, gripper-jaws, tack-plunger and its picking-up and tripping lever, and the means for operating said parts correlatively. Fig. 7 is a diagrammatical view, in elevation, of the tack-separator and holder, and their means of operation. Fig. 8 is a similar view of the same parts in another position. Fig. 9 is a detail view of the tack-holder. Fig. 10 is a detached view of its anti-friction roller. Fig. 11 is a diagrammatical view, in elevation, of the gripper jaws, and the means for opening and closing the same. Fig. 12 is a detached diagrammatical plan-view of the means for thrusting the gripper-carrier forward. Fig. 13 is a similar view, in another position. Fig. 14 is a detail of a swiveled connection between the operating lever and the train for thrusting the carrier forward. Fig. 15 is a detached perspective of the train of levers. Fig. 16 is a sectional view of the head-stock and gripper-carrier, and the yielding connection between the latter and the train. Fig. 17 is a detached side elevation of the head-stock and the means for rotating the gripper jaws. Figs. 18 and 19 are front elevations of the same, showing the gripper-shaft in different positions. Figs. 20 and 21 are detached plan-views of the gripper-shaft and its means of rotation, showing the same in different positions. Fig. 22 is a sectional view through line 18—18, Fig. 20. Fig. 23 is a detached perspective view of the means for limiting the thrust of the operating link and consequent limitation of the rotation of the gripper-shaft. Fig. 24 is a perspective view of the parts shown in Figs. 17 to 23, assembled. Fig. 25 is a diagrammatical view of the laterally-movable head and the means for oscillating the gripper-shaft. Figs. 26 to 28 are plan-views of the tack-separator in its several positions. Figs. 29 to 31 are longitudinal sectional views of the same. Fig. 32 is a sectional view of the tack-race and tack-separator. Fig. 33 is is an end elevation of the sliding separator. Fig. 34 is a diagrammatical sectional view of the means for elevating and tripping the tack hammer. Fig. 35 is a front elevation of the assembled machine.

In the drawings, 1 indicates a laterally-movable head-stock, which has, projecting from its face, a hub 2, in which is mounted a rock-shaft 4, from the forward end of which depends a rock-arm 3. To the lower extremity of this rock-arm, is connected a universal coupling-joint 5, to which is, also, connected a link 16 through the medium of the pins 15 and 14, respectively. Projecting from the other end of this link 16, is the stud 11, upon which is loosely mounted a circumferentially grooved wheel 10. Secured to one of the guide-ways 255, projecting from the head-stock between which is secured the gripper-carrier 17, is an adjusting block 7, provided with slots 7' and 7'', through the former of which, 7', passes the link 16, while, through the latter is an adjusting binding-nut 115, finding a bearing in the guide-way 255, the function of which nut being to bind the adjusting-block 7 in a laterally adjusted position from the head-stock, to throw the free end of the link 16 toward or away from the gripper-shaft 103.

Mounted in the swinging gripper-carrier 17, which is pivotally secured in the guide-way 255, at 214, is a vertically movable gripper-shaft 103, which passes through a sleeve 12 on its lower end, the function of which sleeve being to close over the gripper-jaws 107, which are secured to the gripper-shaft, and to close the same on the upper of the leather when the device is being operated. Rigidly secured to the shaft 103, are collars 207, 210, between which are loosely mounted rings, or followers, 208, 209, which bear against the end of the lever 104, while, secured to the sleeve 12, are, also, rigid collars 211 and 8, which also form abutting shoulders for loose rings, or followers, 212, 213, between which is secured the end of a lever 105, pivoted in the gripper-carrier 17.

205, 206, constitute a toggle-joint connection between the levers 104, 105, near the free ends thereof, said toggle being operated to separate the gripper-jaws by a link 263 bearing in a head 262, secured to the toggle, the opposite end of the link having a bearing in a head 261, which head is pivotally connected to a depending projection on an angle-lever 260, which has a bearing in the lever 233, which latter is a continuation of the lever 104. Pivoted at 232', through the medium of the head 231, is a link 230, the lower end of which has a bearing in a head 229, which head, also, affords bearing for one end of a lever 226, which is pivoted at 228, which lever 226 has a fulcrum on a transversely-disposed shaft 235, mounted in the frame of the machine. The inner end of this lever 226 bears against a cam 111, which cam rocks the lever, which transmits, through the medium of the link 229, angle-lever 260, levers 233—104 and 105, a separating movement to the toggle-joint which movement moves the shaft 103 vertically, thereby opening and closing the gripper-jaws 107.

To obviate the difficulty of the parts not being fitted to act with exact precision, correlative to each other, I have mounted, in a bearing 99, on pivot-pin 100, a restraining lever 97—98, the forward end of which, when in its lowered position, rests upon the upper end of the gripper-shaft 103, thereby, not only tending to hold the grippers to their work, in the act of gripping, but, also, enabling the toggle to act more positively at the right moment. The rear end 97, of this restraining lever, is provided with a stud 110, upon which is mounted an anti-friction wheel 109, said wheel being normally in contact with the periphery of the cam 111, mounted on the shaft 75 and keyed thereto, through the medium of the key 76. The diameter of this cam 111 is increased gradually, as at 108, to enable the anti-friction wheel 109, which rides upon the periphery of the cam, to gradually elevate the rear end of the lever 97—98, thus forcing the end 98 down, and, with it, the gripper-shaft 103, which not only returns the toggle-separating mechanism to its normal position, but forces the jaws 107 out of engagement with the lower end of the sleeve 12, making them ready for the next operation of gripping.

102 indicates a spring for normally holding the rear end of the lever 97—98 in contact with the cam 111.

Secured to the extreme forward end of the lever 226, at 237, is a controlling rod 154, which extends downwardly into the frame of the machine, and is pivoted to one end of a link 152 at 153.

151 indicates a stirrup bolted to the under side of the frame and straddling the link 152, the lower end being closed by a cross-piece 151$^a$ which supports a retraction spring 151$^b$ the upper end of which bears against the link 152, and returns the same after depression.

150 is a rod passing through the retraction spring and connected to the link 152, the lower end of the rod passing through a stirrup 149 and terminating in a cap which confines a compression spring 149$^a$ between it and the upper cross-piece of the stirrup. 141 represents a foot-operated lever, pivoted at 142, to a bracket-piece 143, which is secured to a cross-piece 144 of the frame or base of the machine 140, by screws 144'. The stirrup 149, is pivoted near the forward end of the foot-lever 141, at 148, whereby, when the former is depressed, it tends to depress the confined springs 149$^a$ in the stirrup 149, through the medium of the cap on the end of the rod 150, thus exerting a constant downward pressure on the link 152 and its connected controlling rod 154, which latter controls the movement of the lever 226 and its associate parts which actuate the gripper jaws. When the foot-lever is released, the retraction spring 151$^b$, which exerts a pressure on link 152, will return the parts to their normal positions. The advantage of making this controlling medium yielding, is derived from the fact that, very often, the operator will depress the foot-lever 141 in advance of the inner end of the lever 226, coming into contact with a reduced portion of the cam 111, which will permit the lever 141 to be depressed to its fullest extent and the lever 226 will always be under tension to automatically throw itself out of engagement at the proper point.

The means for moving the head-stock laterally is substantially the same as that shown and described in my patent, heretofore mentioned, and consists of a rock-shaft 157, mounted in a pillow-block 158 which is fastened to the bed of the frame 162 by bolts or screws 158'. Projecting from the ends of this rock-shaft, are two rock-arms, 38 and 159, the former being longitudinally slotted for the passage of an adjustable pivot-bolt 164 mounted in the upper end of the controlling rod 116, projecting upward from the frame, the function of which will be hereinafter described.

Mounted on the frame 112 of the machine, which frame forms a guide-way for the sliding head-stock, is a rock-arm 165, pivoted on a bolt 166, which has a bearing in a projection 167 extending laterally from the frame 112. The upper member of this rocking arm is connected by a bolt 168 to a link 169, the other end of said link being connected to the head-stock, and, through the medium of which the head-stock receives its motion. The lower member of this rocking arm 165 is longitudinally slotted for the passage of the pivot-bolt 164. By slotting the two arms 38 and 165, the pivot-bolt 164 is permitted to slide therein, thus changing the pivotal point of the intersecting axes of the arms, and, through this means, the throw of the head-stock is adjusted.

116 indicates a rod, the function of which being to control the lateral movement of the head-stock, said rod, as before stated, being provided with a pivot-bolt 164 passing through the slots in the arms 38 and 165. The lower end of the arm projects downwardly through the bed 162 into the frame of the machine, where it is connected to a link 118 by pivot-bolt 117. The opposite end of the link 118 is connected, by pivot-bolt 119, to an angle or bell-crank lever 120—which lever is pivoted at 138 in the rear of the frame 140. Secured to the lower extension of the bell-crank lever, at 121, is a link or actuating rod 122, the forward end of which passes through a supporting bracket 123.

122' indicates a notch, preferably in the lower edge of the rod 122 near its forward end, said notch being adapted to fall over the bracket 123 and retain the bell-crank lever in one of its extreme positions.

124 represents a cap piece on the end of the rod 122, by binding screw 125, upon the face of which is secured a knee-pad 126.

Secured to the horizontal portion of the bell-crank lever 120, is a spring 157 to return the same to its normal position, and, at 128, is an extension 127 to the end of which, at 130, is pivotally secured a stirrup 129 which confines a coiled spring, as in the instance of the stirrup 149.

132 indicates a rod provided with a cap piece at its lower end against the upper face of which bears the spring in the stirrup. The upper end of the rod 132 is secured in a head 133 pivoted to a lever 135, at 134, which lever is fulcrumed in a bracket projecting from the under side of the bed on the frame. The forward end of the lever 135 is connected, by pivot-bolt 136 to a controlling rod 137, which extends upwardly through the bed 162, and is connected at its upper end, in a head 224, forming a universal coupling. Also connected in this head 224, by pivot-bolt 225, is a rock-arm 223, mounted on shaft 235, the opposite end 236 of said arm extending rearwardly and contacting with a cam face in the side of cam 111.

Projecting upwardly from the coupling 224, is a link 234, the upper end of which terminates in a coupling-head 234$^a$, which affords pivotal reception for the end of a rock-arm 234$^b$ secured to the rear end of the rock-shaft 4, which controls the rotating, or crimping, mechanism of the gripper-jaws. This crimping mechanism, as before stated, consists of a depending rock-arm 3, secured to the forward end of rock-shaft 4, the lower end of the arm 3 actuating a link 16 through coupling 5. Projecting from the collar 8, rigidly secured to the sleeve 12, are two prongs of a bifurcated lever-arm 9, which pass on each side of the peripherally-grooved wheel 10, and form a bearing therefor by the impingement of the projecting flanges on the wheel. To adjust the throw of the arm 9 and the dependent rotation of the sleeve 12 which controls the action of the gripper-jaws, mounted in the lower end of shaft 103, I laterally adjust the position of the block 7, which forces the free end of the link 16 toward or from the sleeve 12, thus increasing or diminishing the leverage on arm 9, which, at its normal position, is adapted to receive a given movement relative to the movement of the link 16. To increase the degree of rotation of the sleeve 12, it is only necessary to loosen the nut 115, and extend the block 7 out from the head-stock, which will carry with it the link 16, and shorten the leverage connection therewith with the lever arm 9, which short leverage receiving the same movement of the normal leverage will necessarily move the sleeve 12 in a greater degree of rotation. To diminish the degree of rotation, the block 7 is moved in an opposite direction, or closer to the head-stock 1, which throws the pivotal point of connection 11 away from the sleeve 12, thereby decreasing the degree of rotation on account of the longer leverage.

From the foregoing, it will be noted that the actuation of the bell-crank lever 120 (mounted in the frame of the machine) by pressure being applied to the knee-pad 126, will actuate the yielding controlling levers 116 and 137, thereby changing the mechanism for actuating the head-stock laterally from a long to a short stroke, and simultaneously therewith throwing into engagement the mechanism which rotates the gripper-jaws.

In Figs. 12, 13, 14, 15, and 16, I have illustrated a train of levers and its connection with the gripper-carrier 17, for communicating to the latter a forward and backward movement which is very desirable when the gripper-jaws are crimping the upper, when making the short turns around the last, such as the toe and heel. This train is connected to, and operated by, the rock-arm 159 which is secured on rock-shaft 157 mounted in the pillow-block 158. The lever 159 is provided at its free end with an anti-friction roller 160 which engages the cam-groove 161 in the cam 113 mounted on the shaft 75, which cam-groove causes the arm 159 to vibrate in a given space, together with its conjoined arm 38, which latter, as before stated, transmits a variable movement or throw to the head-stock, by the adjustment of the pivotal point of longitudinal intersection between it and the rocking-arm 165.

19 (see Figs. 12, 13, 15, and 16) indicates a plunger-block slidingly mounted in the lower end of the pivoted gripper-carrier, said plunger, when in its retracted position, normally resting against a transverse pin 19' passing through the elongated open slot 20' therein, said slot extending nearly the whole length of the plunger, to permit the play of the pin, and having its open end closed by the link 20, which is pinned in the plunger by pin 30.

19ª indicates a compression spring fitted in the plunger opening and in advance of the plunger, the function of said spring being to receive the thrust of the plunger, and if, when the grippers take hold of the upper, the stock is too heavy or stiff to yield, the gripper-carrier, with its contained grippers, will not be positively driven forward, which might, possibly, be deleterious to the operativeness of the working parts of the machine, but will yield and constantly exert a pressure, which, when the folder-arm is thrust out to make the fold, will effectually assist in this latter operation.

20 indicates a link, one end of which is secured by pin 30 in the plunger 19, and its other end at 28 to arm 21' of angle lever 21—21', which angle-lever is pivoted at 26 through hub 22 to a projection in the rear of frame 112. The opposite arm 21 of the angle-lever is connected to a link 33 by pin 29, the opposite end of the link being secured to a cross-head 34 by pin 31. This cross-head is slidingly mounted on a threaded rod 35, on one end of which are the adjusting nuts 41, 42.

36 indicates a head on the opposite end of the rod 35, between which and the cross-head is a coil spring 34' surrounding the rod 35.

37 indicates a coupling connected to head 36 by pin 32, and by pin 39 to the rock-arm 159. The arm 159 being vibrated by the cam 113, operates the train of levers, which levers communicate a thrust upon the plunger, as indicated by arrows in Fig. 15, which thrust, as before stated, is directed against the spring 19ª and from thence communicated to the gripper-carrier 17. The movement of the plunger may be regulated to any desired stroke by the adjustment of the nuts 41, 42 on rod 35. The nearer they are placed to the head 36, the quicker the motion will be transmitted to the plunger and, consequently, a greater throw of the gripper-carrier is obtained, while the position of the nuts 41, 42 nearer the end of rod 35 or away from the head 36, will accomplish an opposite result. The function of spring 34', interposed between cross-head 34 and head 36 is to yieldingly return the gripper-carrier to its seat without shock or jar; it, also, permits the parts to assume their normal positions with the least friction, and in the easiest manner.

79 indicates a tack receptacle, preferably of that form and construction illustrated and described in my Patent No. 472,599, said tack receptacle being mounted on a bracket extension 65 secured to the bracket frame 78 (which latter forms one bearing for the transverse shafts of the machine) by screws or bolts 92.

48 indicates the race provided with a slot or way 49 through which the tacks are fed to the separator. Transversely arranged across the lower end of the stationary race-way, is a reciprocating or sliding tack separator (see Figs. 28 to 33), consisting of a plate 45 which is formed with a recessed portion 55 corresponding in length to the movement of the plate, the open side of said recessed portion being toward the tack-race, and forming a finger or projection 55'. Secured to the under side of the plate 45, is a needle or nose of a length sufficient to substantially close the opening of the recessed portion, the inner side being curved to form a point, which point is somewhat removed from the projecting finger 55' in a direction toward the tack-race, so as to throw the point of the needle in advance of the finger 55' and in the path between the two lower tacks, the first of which is forced toward and into the recess 55 by the curvature of the needle. Secured to the lower end of the tack-race, and forming a support for the reciprocating separator, is a tack-guide, which consists of a depending funnel-shaped nose-piece 44, provided with a conical-shaped opening 57, about its center, one of the side walls forming the same being, in line with the tack-race 48, and reduced or recessed at 58, to permit the point end of the tack to readily enter and fall into the opening when acted upon by the needle 53. I prefer to form guideways 48 in the upper portion of the tack-guide, to clasp the lips on the longitudinal side edges of the plate 45. The front edge or point of the needle 53 is preferably inclined or beveled, so as to throw the upper edge in advance of the lower, thus stripping the first or lower tack by a shearing motion and forcing it into the opening 57. To maintain the tack in a vertical position and overcome the tendency of the needle, in its advance movement, from tilting the tack from its vertical plane, I form a tack-point guide 54 to one side of the recessed portion 58, and, in line therewith, upon which guide, the point of the tack rides until it is deposited into the conical-shaped opening 57, at which point the tack-point guide terminates, to permit an unobstructed passage or descent of the tack. I also recess the needle at 56, to accommodate this tack-point guide.

51 and 52 are openings for the passage of screws 50, by which the tack-guide is secured to the tack-race.

The tack-guide is formed with a laterally-extending lug or projection 59, in the outer end of which is formed an eye 60 for the passage of a pivot-pin for pivotally connecting the link 61 therewith, the opposite end of said link being connected at 63 to a lever 62, which is fulcrumed, at 64, to the bracket extension 65, the opposite end of which lever being connected at 66 in a head 67 on a connecting rod 68, which, in turn, is connected by pin 69 to one member of a rock-arm 70, having a bearing on a transverse shaft 77 mounted in the rear of the frame of the machine. The other member of this rock-arm is provided with an anti-friction roller 72 mounted on a pin 71, which roller is adapted to remain in constant contact with the periphery of a cam 74, by reason of the tension of the spring 67' exerting a retracting force on the connecting rod 68.

At 73, the periphery of the cam 74 is diametrically reduced, into which recess or reduction, the roller 72 will be impelled by the retraction force of spring 67', thereby transmitting to the tack-separator a reciprocating motion through the train of levers hereinbefore set forth.

The principle of operation of the tack-race is as follows: By reason of the inclined raceway, the tacks will slide down the same by gravity, and crowd the first or lowest one against the flat edge part of the projection 55'. When the reduced portion of the cam 74 arrives at a point to actuate the rocking-arm 70 of the train of levers, the separator-plate, with its needle, is moved (in this instance, toward the right) until the needle point will enter between the first or bottom tack and the one next above, which strips said first or bottom tack from the line, and, by reason of the curvature of the inner edge of the needle, will force the same into the opening 57, the tack-point guide, in the mean time, acting on the point of the tack to prevent the same from tilting. Coincident with this stripping operation, of the first tack, is the consequent downward movement of the remaining tacks, which are caught by the outer straight edge of the needle, and held until the needle is withdrawn, at which time they will fall against the projection 55', and the operation be repeated as before.

80 indicates the jaws of the tack-holder, the rear ends of which are bent upward at an incline, to accommodate the incline of the sliding arm 81, which arm extends rearwardly and upwardly at an incline and is pivotally connected by pin 83 to a connecting rod or actuating link 82, which, in turn, is connected to a rock-arm 85 by pin 84. The rock-arm is mounted on the shaft 77 (at 86), and has a right-angular extension 87 provided with a pin 88 on its end which supports an anti-friction roller 89 running in the side cam-groove 90 in the cam 74. The peculiar shape of this groove is adapted to actuate the tack-holder correlatively with the reciprocation of the tack-separator, and place the same beneath the opening 57, in the tack-guide, when the needle is thrust forward to strip the tack and precipitate it into the opening, through which it is guided and falls of its own gravity into the tack opening in the divided tack-holder or jaws, as is fully shown and described in my Patent No. 472,599.

Loosely mounted in a recess 253' in the lower end of the bar 81, and retained therein by a leaf-spring 251, secured in place by screw 250, are anti-friction rollers 252, the peripheries of which extend below the lower plane of the horizontal portion of the tack-holder, and rest, when the holder is thrust forward, upon the prongs of the folder-arms 237, as shown in Fig. 6.

253 indicates a shaft connecting the two anti-friction rollers 252, having a bearing in recess 253', and against which the spring 251 is exerting a constant pressure to hold the same in place.

The folder-arm 237 is curved at its outer end, as shown in Fig. 6, to enable the same to easily ride over the upper when it is gripped by the jaws 107, and more readily make the fold. The folder-arm is secured to a bracket projection 238, by screws or rivets 238', extending from an oscillating and reciprocating rod 239, which is connected at its rear end, at 241, to a link or connecting rod 240, whose other end is connected by pin 243 to a rock-arm 242 mounted on the shaft 77.

244 represents a right-angular projection extending forward from the rock-arm 242, on the end of which is an anti-friction roller 245 mounted on a pin 246, said roller running in a cam-groove 247 in the side of the cam-drum 74. When the diametrically-increased portion of this cam groove 247 comes in contact with the anti-friction wheel 245 on the end of the right-angular arm 244, it will depress the same, and extend the rock-arm 242 and retract the folder-arm. Simultaneously with this retraction of the folder-arm, the guide-way, or oscillating block, 256, will be oscillated by the roller 250, mounted on pin 252 in the end of arm 249 (which arm is connected to the oscillating block 256 by screws 251, 251', 251") coming in contact with a projection 253, on the periphery of cam 74, depressing said arm and oscillating the guide-way block in which the rod 239 is slidingly mounted. This movement of the guide-block will elevate the folder-arm before its retracting movement is started, carrying it above the fold it has laid, and out of the way of the feed of the upper which is being carried on at this time. To return the oscillating block to its normal position, after oscillation, I place a spring 254 under the rear end of the same, as shown.

178 indicates an arm pivoted to the frame of the machine at 178', its forward end terminating in a head, in which is adjustably mounted a retaining finger 179, against which a binding screw 180 is adapted to impinge, to hold it in place. The rear end of this lever is provided with an anti-friction roller 181, mounted on a pin 182, said roller tending always to contact with a cam 183 mounted on shaft 75, by the tension of spring 184 secured to lever 182 and rear end of the bracket extension 65. The function of this retaining finger is to be forced into the last and hold the work steady while it undergoes the several operations of folding, tacking, feeding, &c.

The guide for the last consists of a depending arm 185, secured by screws 188, to a bracket piece 186, secured to the laterally movable head-stock 1 by screws or bolts 187 (see Fig. 2), said arm being provided with toe and heel projections, 185$^a$ and 185$^b$, the latter forming a shoulder, against which the last rests and is guided, and also acts in the capacity of a self-feeder for the last, the reciprocation of the head-stock giving it a step-by-step movement. To afford a more substantial rest and means for rigidly holding the last when it is subjected to the impact of the hammer, which will, presently, be described, I provide, a reciprocating rest 217 slidingly mounted in a recessed way in the supporting frame 78, to the rear end of which is connected a link 218 by pin 219, the opposite end of the link being connected to a rocking-arm 220, by pin 221, which arm is secured to a sleeve 220$^a$ (see Fig. 3), from which projects, inwardly, a cam-operated rocking-arm 220$^b$ adapted to be actuated by a cam-groove in the left side of the cam 113.

The hammer, or tack-driver, 189, is a vertically disposed rod secured in a head 190 projecting laterally from the plunger-shaft 191.

192 and 192' are bearings projecting forwardly from the frame 193, in which the plunger-shaft has a bearing.

222 is a collar secured on the plunger-shaft by an adjusting screw 222', confining a compression spring 216 between it and the bearing 192, the function of this spring being to exert its force on the plunger-shaft when the same is carried up and tripped, and impel the shaft and its hammer, or rod, to make the impacting blow on the head of the tack carried by the tack-jaws.

To elevate and trip the plunger, I provide the same with a head 194, which is cut away, in its inner side, or provided with an opening 194$^a$, adapted to receive a spring-controlled bolt 170, slidingly mounted in the front end of the lever-arm 171, mounted on a rock-shaft 173, journaled in the frame 78. Secured to this rock-shaft, and extending rearwardly, is a rock-arm 172, to the end of which is connected, by bolt 174, a link or connecting rod 175 whose other end is connected to a rocking-arm 176, said arm being mounted on a shaft 177 on the frame and adapted to be actuated through the medium of a cam roller 176$^a$ mounted about the middle of said arm, said roller running in a side groove in the cam 74 as shown in Fig. 34. The lever 171, with its contained bolt, upon the actuation of the several parts hereinbefore set forth, will dip down, and the bolt 170, being yielding, will be forced back into the lever-arm until the spring is permitted to exert its pressure by reason of the bolt coming opposite the opening 194$^a$. The movement of the lever-arm is then reversed, and, upon its upward movement, will carry, suspended on its bolt 170, against the action of spring 216, the plunger-shaft 191. To retract the bolt and trip the plunger-shaft, I connect to a lateral extension 195$^a$ of the bolt a link, or rod, 195, whose other end is connected to a lever 196 by a pin 197, said lever being fulcrumed on a bolt 199, mounted in the frame 78.

198 is a rocking-lever, mounted on bolt 199, its lower end terminating in a cam-roller 200, which bears against cam 111, the face of which is provided with a trip or lug 200$^a$ which, coming in contact with the roller 200 on lever 198, will force the same forward, and, it being pivoted upon the bolt 199, will carry with it its attached arm 196, which communicates a retracting movement to the bolt, and trips the plunger-shaft.

201 indicates a pillow-block, in which is mounted the shaft 75, carrying the cams, said block being provided with journal plates 202, and a cap-piece 203, for the bearing. The shafts 77 and 235 also have one of their ends mounted in the pillow-block, while the block 78 affords reception for their opposite ends.

204 indicates a driving pulley, through the medium of which power is imparted to the machine.

Having thus described my invention, what I claim, and desire to secure by Letters Patent of the United States, is—

1. In a lasting machine, the combination, with mechanism for gripping and drawing the upper over the last securing mechanism, comprising the tack-race and its supporting block for the reciprocating separator, at the end of the tack race a reciprocating separator, slidingly mounted in the block, means for reciprocating the separator and a tack-deliverer mounted in an inclined way and adapted to receive the tack from the separator and deposit it at a point below the plane where it received it: substantially as, and for the purposes described.

2. In a lasting machine, the combination with the mechanism for gripping and drawing the upper over the last, of the upper securing mechanism comprising the tack race, the tack separator at the end of the race, tack delivering jaws mounted in an inclined way, a folder arm below the delivering jaws, and a plunger; substantially as and for the purposes described.

3. In a lasting machine, the combination with the mechanism for gripping and drawing the upper over the last, of a tack deliverer for delivering tacks upon the upper, an anti-friction roller in the lower forward end of said deliverer adapted to rest against a folder arm when in position for delivery, a folder arm, and a plunger; substantially as and for the purposes described.

4. In a lasting machine, the combination with the mechanism for drawing the upper over the last, of a tack deliverer for delivering the tacks upon the upper, a roller in the lower forward end of said deliverer adapted to rest against the folder arm when in position, a spring for holding said roller in position, a folder arm, and a plunger; substantially as and for the purposes described.

5. In a lasting machine, the combination with a reciprocating folder-arm, of a rocking way therefor, and means for rocking said way: substantially as, and for the purposes described.

6. In a lasting machine, the combination with the folder-arm, of a rocking guide-way therefor, and means for rocking the guide-way and reciprocating the folder-arm: substantially as, and for the purposes described.

7. In a lasting machine, the combination with the folder-arm, of a rocking guide-way in which said folder-arm is slidingly secured, means for rocking said guide-way and reciprocating the folder-arm, and a spring for returning the guide-way to its normal position after actuation: substantially as, and for the purposes described.

8. In a lasting machine, the combination with a gripper shaft and gripper jaws, of a projection on the gripper shaft, a rocking arm, and a connection between the rocking arm and projection, whereby when the arm is rocked, the gripper jaws are rotated; substantially as and for the purposes described.

9. In a lasting machine, the combination with a head-stock, of a gripper-shaft mounted therein, and gripper jaw on the shaft a bifurcated lever, extending from the shaft and adapted to rotate the same, a rock-arm, a rod having a sliding connection with the bifurcated lever and its other end connected to the rock-arm, and a slidingly-adjustable block mounted on the head-stock, and encircling the connecting rod: substantially as, and for the purposes described.

10. In a lasting machine, the combination, with the laterally-movable head-stock, of a pivoted gripper-carrier mounted therein and adapted to swing outward and return, a gripper-shaft mounted in said carrier, an extension on the gripper-shaft, a rock-arm, and a swiveled connection between the rock-arm and extension on the gripper-shaft; substantially as, and for the purposes described whereby, when the rock arm is actuated, it communicates a rotary movement to the gripper shaft through the medium of its connection therewith; substantially as and for the purposes described.

11. In a lasting machine, the combination, with the head-stock, of a gripper-carrier, a gripper-shaft mounted therein, a bifurcated arm, extending therefrom, a connecting rod, provided with a stud, or pin, in its end, a grooved roller mounted on said pin, the groove in which affording reception for the prongs of the bifurcated arm, and a rocking-arm: substantially as, and for the purposes described.

12. In a lasting machine, the combination, with means for adjustably rotating the gripper-shaft, of a cam for actuating said means, a controlling lever, for controlling said means, and a yielding connection between the controlling lever and cam-actuated lever: substantially as, and for the purposes described.

13. In a lasting machine, the combination, with the gripper shaft, of an extension thereon, a rocking arm, a connection between the rocking-arm and extension, a cam-actuated lever, intermediate connections between said lever and rocking-arm, for communicating a rotary movement to the gripper shaft and a yielding controlling lever, connected to the cam-actuated lever, for controlling the movement of the same: substantially as, and for the purposes described.

14. In a lasting machine, the combination with the gripper jaws for drawing the upper over the last, and their actuating mechanism, of a controlling device for said actuating mechanism, comprising a stirrup, a rod passing through said stirrup and provided with a cap on its end, a compression spring interposed between the cap and stirrup, and a foot-lever, to which the stirrup is secured: substantially as, and for the purposes described.

15. In a lasting machine, the combination, with the gripper jaws for drawing the upper over the last and their actuating mechanism, of means for controlling the movement of said mechanism, comprising a controlling rod 154, a lever 152, to which the same is pivoted, a strap or stirrup, a compression spring mounted in the stirrup and bearing against the lever, a foot-lever, strap or stirrup pivoted thereto, a rod passing through the stirrup provided with a cap on its end, and a compression spring, interposed between the cap and stirrup: substantially as, and for the purposes described.

16. In a lasting machine, the combination, with a vertically-movable gripper-shaft, of an independently operated restraining bar for controlling the upward movement of said shaft: substantially as, and for the purposes described.

17. In a lasting machine, the combination, with gripper-shaft and jaws, of mechanism for closing said jaws, and an independently operated restraining bar, the free end of which bears against the upper end of the gripper shaft for holding the shaft against longitudinal movement while the jaws are being closed: substantially as, and for the purposes described.

18. In a lasting machine, the combination, with the head-stock, of a gripper-carrier pivoted therein, actuating mechanism for moving the head-stock laterally, and a connection between said actuating mechanism and the gripper-carrier, for moving the said gripper-carrier backward and forward simultaneously with the lateral movement of the head-stock: substantially as, and for the purposes described.

19. In a lasting machine, the combination, with a laterally-movable head-stock and means for moving said head-stock laterally, of a swinging gripper-carrier pivotally mounted in said head-stock, and an adjustable connection between the gripper-carrier and actuating mechanism for the laterally-movable head-stock for moving the gripper carrier backward and forward simultaneously with the lateral movement of the head-stock: substantially as, and for the purposes described.

20. In a lasting machine, the combination, with a laterally-movable head-stock and means for moving the head-stock laterally, of a swinging gripper-carrier mounted in the head-stock, means for swinging said gripper-carrier forward and backward, and a controlling lever for adjusting the stroke of the laterally movable head-stock: substantially as, and for the purposes described.

21. In combination, with the gripper-carrier, its gripper jaws and actuating mechanism, of a plunger adapted to actuate the gripper carrier being provided with a slot, a pin passing through said slot, a compression-spring for receiving motion from the plunger, a connecting rod secured in the plunger, bell-crank lever for actuating said rod and plunger, and means for actuating the bell-crank: substantially as, and for the purposes described.

22. In a lasting machine, the combination, with a gripper-carrier, its gripper jaws and actuating mechanism therefor, in which is included a cam-operated rock-arm, a rod swiveled to said rock arm, a head slidingly mounted on said rod, a compression spring bearing against the head, adjusting nuts and a connection between the sliding head and gripper-carrier: substantially as, and for the purposes described.

23. In a lasting machine, the combination with a laterally movable head-stock, of a swinging gripper carrier pivoted therein, cam operated lever arms for receiving and transmitting the lateral movement to the head stock, and a sliding connection between one of said arms and the gripper carrier, whereby the thrust of the gripper carrier is made yielding, and its return positive; substantially as and for the purposes described.

24. In a lasting machine, the combination with a laterally movable head stock, of a swinging gripper carrier pivoted therein, cam operated lever arms for moving the head stock laterally, a plunger in the gripper carrier, and a connection between one of said cam operated lever arms and the plunger, comprising a sliding connection, a spring, and adjustable abutting nuts for the sliding connection, whereby the gripper carrier is yieldingly thrust forward, and positively returned; substantially as and for the purposes described.

25. In a lasting machine, the combination with a laterally-movable head-stock, a gripper-carrier mounted in said head-stock so as to be movable independently thereof, and gripper jaws of means substantially as described herein for moving said gripper-carrier, consisting in a cam-operated lever-arm, connections between the free end of the lever-arm and said gripper-carrier, said intermediate connections having included therein a sliding connection, adjustable abutting nuts and a compression spring, whereby the forward movement of said lever-arm is positively transmitted an adjustable amount to the intermediate connecting parts, and the reverse movement of said lever-arm is transmitted to the said intermediate connecting parts through the said compression spring: substantially in the manner described, and for the purposes specified.

26. In a lasting machine, the combination with a laterally movable head stock carrying the gripper shaft and gripper jaws, of a rocking lever for moving the head stock laterally, said lever being provided with a slotted member, a slotted rock arm, a controlling rod provided with a sliding pivot for adjusting the intersection of the longitudinal axis of the two slotted arms, and a yielding lever for actuating said controlling lever: substantially as and for the purposes described.

27. In a lasting machine, the combination, with the head stock, gripper shaft, and gripper jaws, of means for controlling the movement of said gripper jaws, comprising a controlling rod 137, a pivoted lever, to which the same is connected, a rod connected to the opposite end of said lever, a cap on the end of the rod, a stirrup, pivoted on a bell-crank lever, a compression spring interposed between the cap on the rod and stirrup and means for actuating the bell-crank lever: substantially as, and for the purposes described.

28. In a lasting machine, the combination with the head stock gripper shaft and gripper jaws, of means for controlling the movement of said jaws, comprising a controlling rod, a bell-crank lever for actuating said rod, a rod for actuating the bell-crank lever provided with a notch or recess to limit its movement, and a knee-pad on the outer end of the rod: substantially as, and for the purposes described.

29. In a lasting machine, the combination with the head stock, gripper shaft and gripper jaws, of means for controlling the movement of the gripper-jaws, comprising a bell-crank lever, a yielding connection between the bell-crank lever and controlling rod 137, a rod 116 for controlling the throw of the head-stock, connected to the bell-crank lever and means for actuating the bell-crank lever: substantially as, and for the purposes described.

30. In a lasting machine, the combination, with the laterally-movable head-stock, of a gripper-shaft provided with gripper-jaws, and mechanism for actuating the several parts, rods for controlling the movements of the head-stock and gripper-jaws, and means for actuating the rods simultaneously whereby, at the same time of the shortening of the throw of the head stock, the gripper jaws are rotated: substantially as, and for the purposes described.

31. In a lasting machine, the combination, with the laterally-movable head-stock, of a gripper-shaft, provided with gripping-jaws, rods for controlling the movements of the head-stock, and gripper-jaws, a bell-crank lever, to which said rods are connected, an actuating rod for the bell-crank lever, and a knee-pad on said rod: substantially as, and for the purposes described.

In testimony whereof I have affixed my signature, in presence of two witnesses, this 23d day of February, 1892.

JOHN T. AVERY.

Witnesses:
JOS. W. CROOKES,
A. RAMEL.